United States Patent [19]

Sullivan

[11] Patent Number: 5,489,190
[45] Date of Patent: Feb. 6, 1996

[54] DYNAMIC OIL SCAVENGE SYSTEM

[75] Inventor: John D. Sullivan, Phoenix, Ariz.

[73] Assignee: AlliedSignal Inc., Morris Township, N.J.

[21] Appl. No.: 283,485

[22] Filed: Jul. 29, 1994

[51] Int. Cl.$^6$ .................................................. F01D 25/18
[52] U.S. Cl. ..................... 415/175; 60/39.08; 184/6.11; 384/292; 384/472
[58] Field of Search ..................... 415/175, 180, 415/229; 60/39.08; 184/6.11; 384/292, 472, 473

[56] References Cited

U.S. PATENT DOCUMENTS

| | | | |
|---|---|---|---|
| 2,848,284 | 8/1958 | Atkinson et al. | 384/472 |
| 4,080,783 | 3/1978 | Hamburg et al. | 60/39.08 |
| 4,144,950 | 3/1979 | Moyer et al. | |
| 4,265,334 | 5/1981 | Benhase, Jr. | 60/39.08 |
| 4,344,506 | 8/1982 | Smith. | |
| 4,378,197 | 3/1983 | Cattaneo et al. | 415/175 |
| 4,500,143 | 2/1985 | Kervistin et al. | 415/180 |
| 4,576,001 | 3/1986 | Smith. | |
| 4,683,714 | 8/1987 | Thebert. | |

FOREIGN PATENT DOCUMENTS

| | | | |
|---|---|---|---|
| 987163 | 8/1951 | France | 384/292 |
| 645401 | 11/1950 | United Kingdom | 415/229 |

*Primary Examiner*—Edward K. Look
*Assistant Examiner*—James A. Larson
*Attorney, Agent, or Firm*—Jerry J. Holden; James W. McFarland

[57] ABSTRACT

An oil scavenge assembly for small gas turbine engine. The assembly includes a rolling element bearing, for supporting a rotating shaft, slip fit within a bearing liner. The bearing liner has a plurality of helical grooves along its surface. A plurality of circumferentially spaced scoops extend inward from the liner and direct the oil expelled from the bearing into the helical grooves.

1 Claim, 4 Drawing Sheets

DYNAMIC OIL SCAVENGE SYSTEM

TECHNICAL FIELD

This invention relates generally to gas turbine engines, and in particular to lubricant scavenge systems for such engines.

BACKGROUND OF THE INVENTION

Gas turbine engines employ high speed bearings that require a continuous supply of oil for lubrication and cooling. For optimum performance, the oil flow must be properly directed into and away from the bearings. Failing to remove or scavenge oil from the bearing can be as detrimental to the bearing as insufficient oil flow because the churning of unscavenged oil within the bearing can rapidly lead to overheating.

In a conventional lubrication system, oil is supplied to the rolling elements of the bearings under pressure and then relies on gravity or its dynamics to drain back to a reservoir. The most effective way to accomplish the return flow is to maintain an open, straight, and unrestricted passageway from the bearing back to the sump. However, in small gas turbine engines such passageways are very difficult to construct because bearing cavities tend to be limited in volume and located in isolated areas within the engine.

As shown in FIG. 5, one approach to this problem has been to integrate the oil return passageway with the bearing liner 8 in the form of axial channels along the liner's outer surface. However, as engines get smaller and operating speeds increase, there is always need for improved lubricant scavenging.

SUMMARY OF THE INVENTION

An object of the present invention is to provide a scavenging system that can be used in small gas turbine engines.

Another object of the present invention is to provide a lubricant scavenging system for gas turbine engines which uses the momentum of the lubricant to flow it axially back to the sump.

The present invention achieves these objectives by providing an oil scavenge assembly that includes a rolling element bearing that is a slip fit within a bearing liner. The rotating elements of the bearing impart momentum to the oil which has a tangential component. The bearing liner has a plurality of helical grooves along its outer surface and a plurality of circumferentially spaced, inward extending scoops. The scoops direct the oil expelled from the bearing into the helical grooves, while conserving the momentum of the oil.

DESCRIPTION OF THE PREFERRED EMBODIMENT

Figure 1:
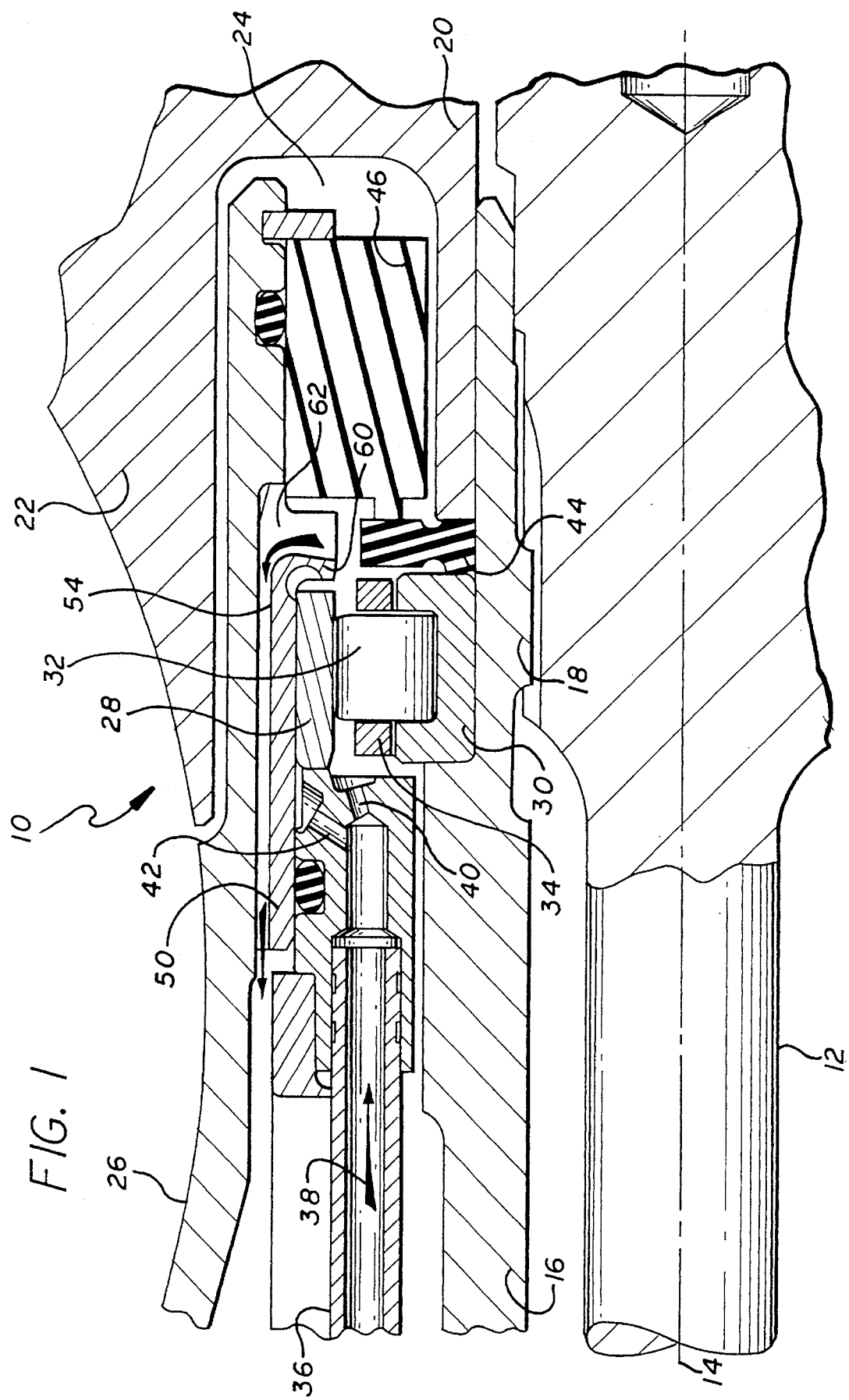
FIG. 1 is a cross section of a portion a gas turbine engine having a oil scavenge system contemplated by the present invention.

A portion of a gas turbine engine 10 is shown in FIG. 1. The engine 10 includes a rotating turbine shaft 12 concentric about the engine's axial centerline 14. A gear shaft 16, circumscribes and is driven by the shaft 12 through splines 18. At one axial end, a compressor shaft 20 is frictionally mounted to the gear shaft 16. A centrifugal compressor hub portion 22 extends radially from the a shaft 20 to define an open ended, annular channel 24. Axially adjacent the hub portion 22 is an annular gearbox casing 26. A portion of the casing 26 extends under the hub portion 22 and into the channel 24. The casing 26 circumscribes and is radially spaced from the rotating shafts 16 and 20.

The gearshaft 16 is journalled to the gearbox casing 26 by a rolling element bearing. The bearing is of a conventional design and includes a stationary outer race 28, a rotating inner race 30 mounted to the compressor shaft 16, a plurality of rolling elements 32 disposed between the races 28,30 and a cage 34. Slip fit around the outer race 38 is a bearing liner 50. A gap, not shown, of about 0.005 inches is maintained between the liner 50 and outer race 28. The liner 50 also contacts the gearbox casing 26.

Referring to FIG. 1, to the left of the bearing is an oil passageway 36 which delivers cooling oil 38 to the rolling elements 32 through a jet 40. A second jet 42 delivers oil to the gap to provide damping. To the right of the bearing is a rotating seal 44 and a stationary face seal 46 mounted in a manner familiar to those skilled in the art to prevent oil from leaking through channel 24 into the air flow entering the compressor.

Figure 2:
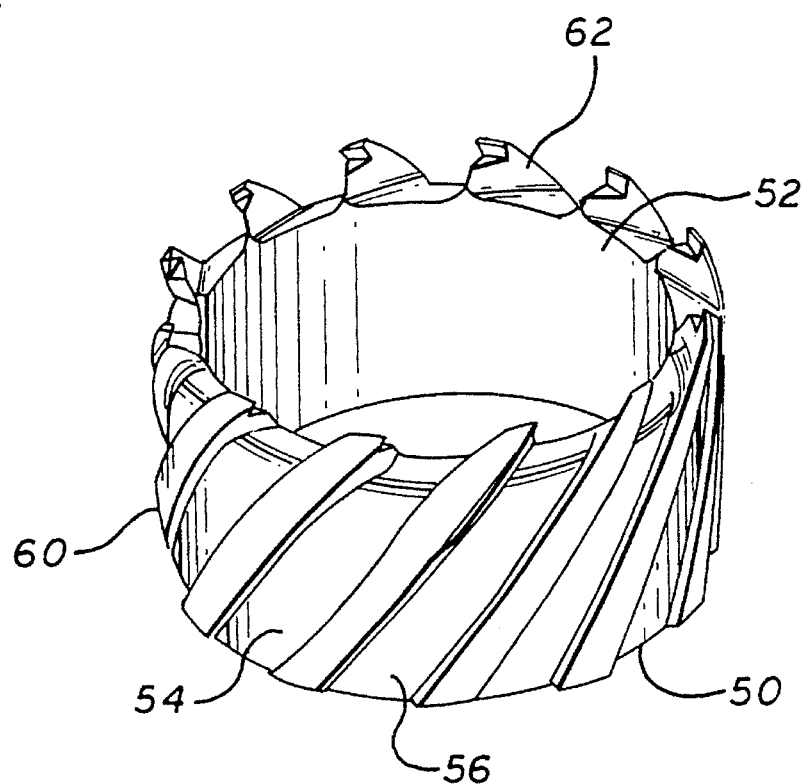
FIG. 2 is a perspective view of a bearing liner used in the oil scavenge system of FIG. 1.
Figure 3:
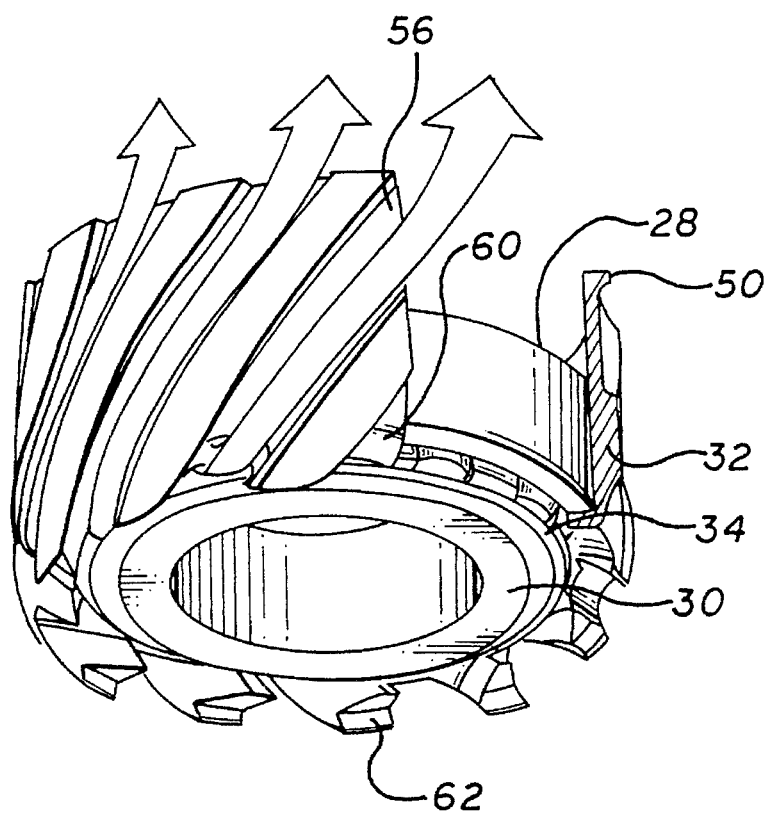
FIG. 3 is another perspective view showing a bearing mounted in the bearing liner of FIG. 2.
Figure 4:
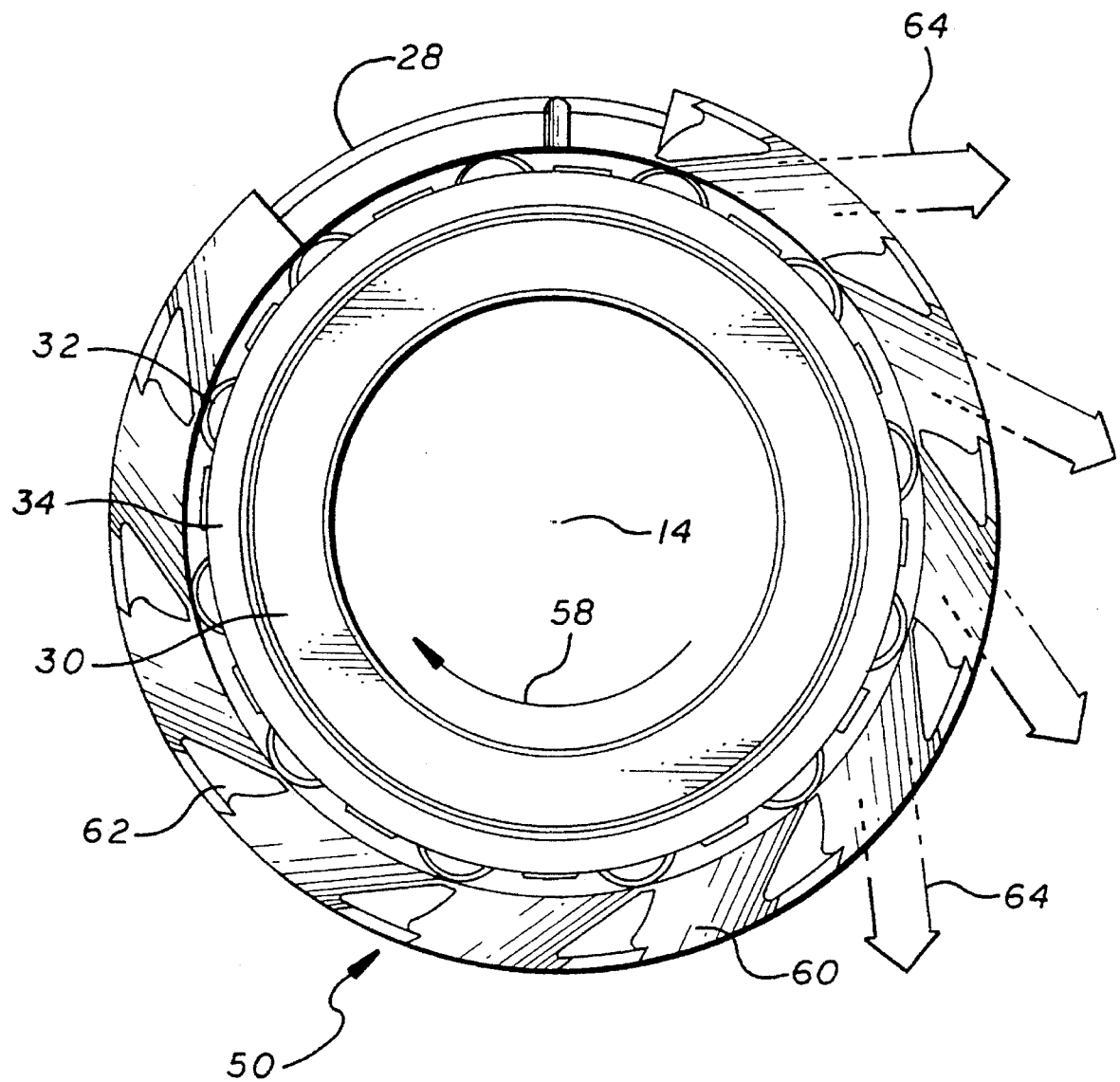
FIG. 4 is a front view of the bearing and liner of FIG. 3.
Figure 5:
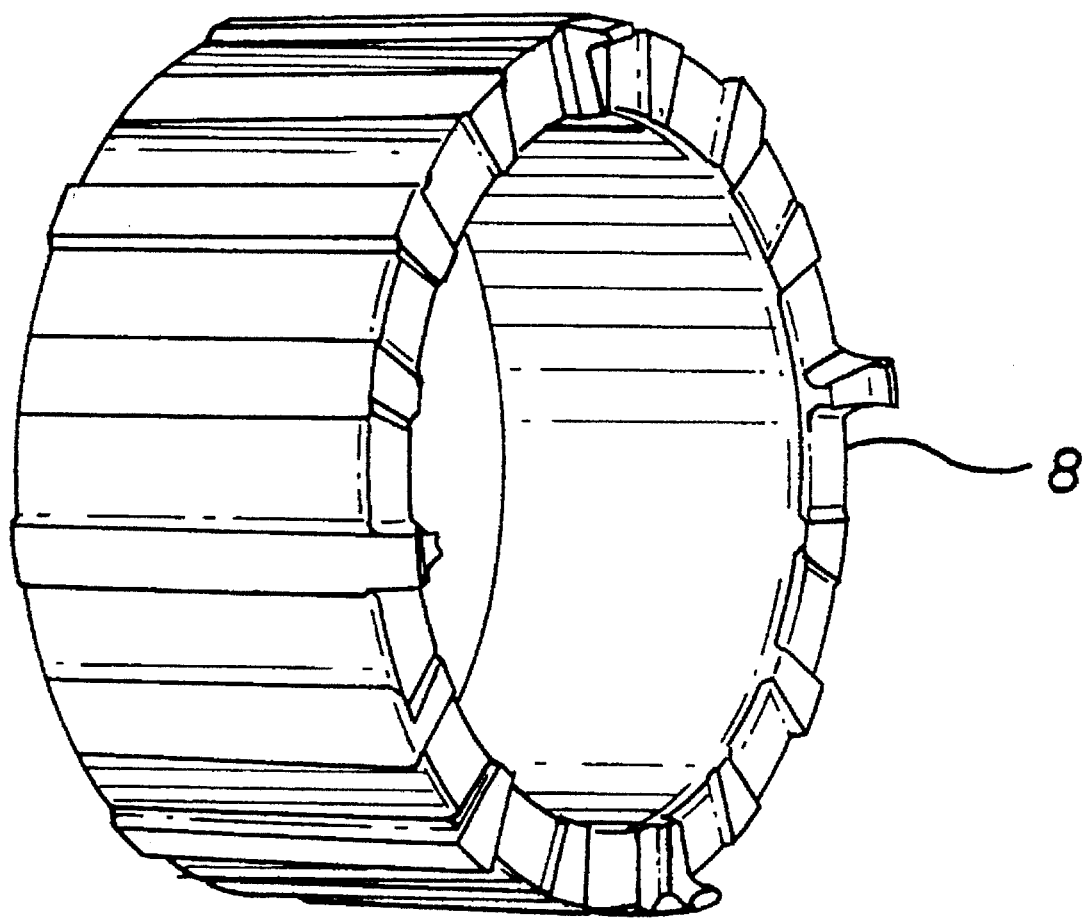
FIG. 5 is a perspective view of a prior art bearing liner.

Referring to FIGS. 2–4, the bearing liner 50 is cylindrical and coaxial with the engine centerline 14. The bearing liner 50 has an inner surface 52 and an outer surface 54. Cut into the outer surface 54 are a plurality of equally spaced, helical grooves 56. Each of the grooves 56 has the same width and height and extends the entire length of the liner 50. To achieve the largest flow area the width and height of the grooves 56 should be maximized without adversely affecting the structural integrity of the liner 50. The grooves 56 spiral axially in the direction of rotation 58 of the inner race 30. Preferably, at a helix angle of about 40 degrees from the axial direction.

At one axial end, the liner has a lip 60 that gradually curves, radially inward. The lip 60 has a plurality of circumferentially disposed scoops 62, with two scopes 62 defining a radial passage therebetween that curves into one of the helical grooves 56. When assembled, the lip 60 should be adjacent an axial facing surface of the outer race 28 on the side of the bearing where used oil is ejected. Like the dimensions of the grooves 56, the size of the radial passages is selected to maximize the flow area without adversely affecting the structural integrity of the liner 50.

During operation, pressurized oil flows, from a sump not shown, through the passageway 36 and then to the nozzles 40, 42. Oil from the nozzle 42 is ejected into the rotating parts of the bearing where it both lubricates and cools the rolling elements 32. In turn, the rolling elements 32 impart rotational momentum to the oil a component of which is in the tangential direction. Referring to FIG. 4, if the bearing is rotating in the clockwise direction as represented by arrow 58, then the exiting oil flows in the direction represented by arrows 64. The scoops 62 direct the oil into the helical grooves 56 while maintaining the momentum of the oil. This momentum carries the oil through the grooves 56 and back to the sump.

Various other modifications and alterations to the above described embodiment will be apparent to those skilled in the art. Accordingly, this description of the invention should be considered exemplary and not as limiting to the scope and spirit of the invention as set forth in the following claims.

What is claimed is:

1. In a gas turbine engine having:

a centrifugal compressor having a hub portion extending from a compressor shaft to define an open ended annular channel;

a gearbox casing circumscribing and radially spaced from a rotating turbine shaft concentric about the axial centerline of said engine, said casing having an axial end portion extending into said annular channel;

a gear shaft disposed between said casing and said turbine shaft and drivingly coupled to said turbine shaft and said compressor shaft;

a rolling element bearing disposed adacent said annular channel and mounted to said gear shaft and having a first axial end receiving a lubricant and a second axial end expelling said lubricant, said bearing including an inner race mounted to said gear shaft, an outer race concentric with said inner race, and a plurality of rolling elements mounted therebetween;

an annular bearing liner disposed between said casing and said outer race and having a plurality of axially extending, helical grooves along its outer surface; and a plurality of circumferentially spaced apart. scoops integral with said liner and extending radially inward adjacent said second axial end of said bearing, said scoops defining a plurality of radial passageways each of which curves into one of said helical grooves.

* * * * *

UNITED STATES PATENT AND TRADEMARK OFFICE
CERTIFICATE OF CORRECTION

PATENT NO. : 5,489,190

DATED : February 6, 1996

INVENTOR(S) : John D. Sullivan

It is certified that error appears in the above-identified patent and that said Letters Patent is hereby corrected as shown below:

Col. 4, line 11, delete the period (.) after "apart"

Signed and Sealed this

Thirtieth Day of July, 1996

Attest:

BRUCE LEHMAN

*Attesting Officer*    Commissioner of Patents and Trademarks